(12) United States Patent
Nishiyama et al.

(10) Patent No.: US 8,116,534 B2
(45) Date of Patent: Feb. 14, 2012

(54) FACE RECOGNITION APPARATUS AND FACE RECOGNITION METHOD

(75) Inventors: Masashi Nishiyama, Kanagawa (JP);
Mayumi Yuasa, Kanagawa (JP);
Tomoyuki Shibata, Kanagawa (JP);
Tomokazu Wakasugi, Tokyo (JP);
Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1060 days.

(21) Appl. No.: 11/754,030

(22) Filed: May 25, 2007

(65) Prior Publication Data
US 2007/0297652 A1   Dec. 27, 2007

(30) Foreign Application Priority Data

May 29, 2006   (JP) .................................. 2006-147850

(51) Int. Cl.
*G06K 9/00* (2006.01)
(52) U.S. Cl. ........ 382/118; 382/103; 382/115; 382/181; 382/224
(58) Field of Classification Search .................. 382/103, 382/181, 224, 115–127, 190, 209, 218
See application file for complete search history.

(56) References Cited

U.S. PATENT DOCUMENTS

| | | | |
|---|---|---|---|
| 6,690,814 B1 | 2/2004 | Yuasa et al. | |
| 7,127,086 B2 | 10/2006 | Yuasa et al. | |
| 2004/0136574 A1 | 7/2004 | Kozakaya et al. | |
| 2005/0197923 A1* | 9/2005 | Kilner et al. | ..................... 705/27 |
| 2005/0207622 A1* | 9/2005 | Haupt et al. | .................. 382/118 |
| 2006/0269143 A1 | 11/2006 | Kozakaya | |
| 2007/0065015 A1 | 3/2007 | Nishiyama et al. | |

FOREIGN PATENT DOCUMENTS

| | | |
|---|---|---|
| JP | 2000-268172 | 9/2000 |
| JP | 2003-204541 | 7/2003 |
| JP | 2003-242486 | 8/2003 |
| JP | 2004-094518 | 3/2004 |
| JP | 2005-141437 | 6/2005 |
| JP | 2005-227957 | 8/2005 |
| JP | 2006-221479 | 8/2006 |

OTHER PUBLICATIONS

Kawahara et al., "Face Recognition by Orthogonal Mutual Subspace Method," 2005, IPSJ SIG Technical Report, Information Processing Society of Japan.*
U.S. Appl. No. 11/524,270, filed Sep. 21, 2006, Yuasa et al.
U.S. Appl. No. 11/740,465, filed Apr. 26, 2007, Yuasa et al.

* cited by examiner

*Primary Examiner* — Wesley Tucker
(74) *Attorney, Agent, or Firm* — Oblon, Spivak, McClelland, Maier & Neustadt, L.L.P.

(57) ABSTRACT

A face recognition apparatus includes an image sequence acquiring unit, a face image acquiring unit, an intra-sequence classifying unit, an inter-sequence classifying unit, an identification unit, and a reference image storing unit. A plurality of cameras are attached in a corridor for monitoring one place with these cameras, so that when a plurality of moving people pass through, identification is performed for each moving people. Face images are classified into fragmental face image sets, and the fragmental face image sets are classified into integrated sets to achieve the identification.

10 Claims, 9 Drawing Sheets

FACE RECOGNITION APPARATUS AND FACE RECOGNITION METHOD

CROSS-REFERENCE TO RELATED APPLICATIONS

This application is based upon and claims the benefit of priority from the prior Japanese Patent Application No. 2006-147850, filed on May 29, 2006, the entire contents of which are incorporated herein by reference.

BACKGROUND OF THE INVENTION

1. Field of the Invention

The present invention relates to a face recognition apparatus for recognizing moving people using a set of face images acquired from a plurality of cameras and a face recognition method.

2. Description of the Related Art

In order to recognize individuals from a moving people by a plurality of cameras, a method of tracking faces from a video sequence and selecting a best-shot face image from acquired faces for the respective persons is proposed in Japanese Patent Application Kokai No. 2005-227957.

In this method, conditions of the face image such as the size, pose, and lighting conditions are estimated in order to select a best-shot face image.

In the above-describe method, a best-shot face image often cannot be obtained from a single camera because of facial pose caused by people moving freely. Furthermore, the above-describe method needs to consider difficult problems such as a state transition between detecting and tracking faces. For face tracking, occlusion is difficult problems. In addition, when the frame rate of cameras is low, tracking faces is often failed.

Therefore, the present invention provides a face recognition apparatus which recognizes a plurality of persons acquired by a plurality of cameras without selecting face images, and a face recognition method.

BRIEF SUMMARY OF THE INVENTION

According to embodiments of the present invention, there is provided a face recognition apparatus that recognizes faces of a plurality of persons, comprising: an image sequence acquiring unit configured to acquire respective image sequences picked up in time series by respective cameras; a face image acquiring unit configured to acquire face image sets including face images from the respective image sequences; an intra-sequence classifying unit configured to classify the face images in the respective face image sets into fragmental face image sets each including the face images having high correlation with each other; an inter-sequence classifying unit configured to classify the fragmental face image sets into integrated sets each including the fragmental face image sets having high correlation with each other; a reference image storing unit configured to store respective reference face image sets of respective persons acquired in advance for identification; an identification unit configured to compare the respective integrated sets with the reference face image sets to identify the persons.

According to an aspect of the invention, even though near-frontal face images of a person cannot be obtained from a single camera, another cameras increase the probability of the face being detected near-frontally and without occlusion. By classifying face images from a plurality of cameras, fragmental face image sets having high correlation with each other are obtained. Using the fragmental face image sets for identification, a high recognition performance is obtained.

DETAILED DESCRIPTION OF THE INVENTION

Concept of Embodiments

Before describing detailed embodiments, a concept of the embodiments will be described.

In the embodiment, face images of the same person acquired by a plurality of cameras are integrated as a set of face images. A set is used for identification instead of using a single face image. A set contains variations in appliances of the face caused by motion.

Figure 6:
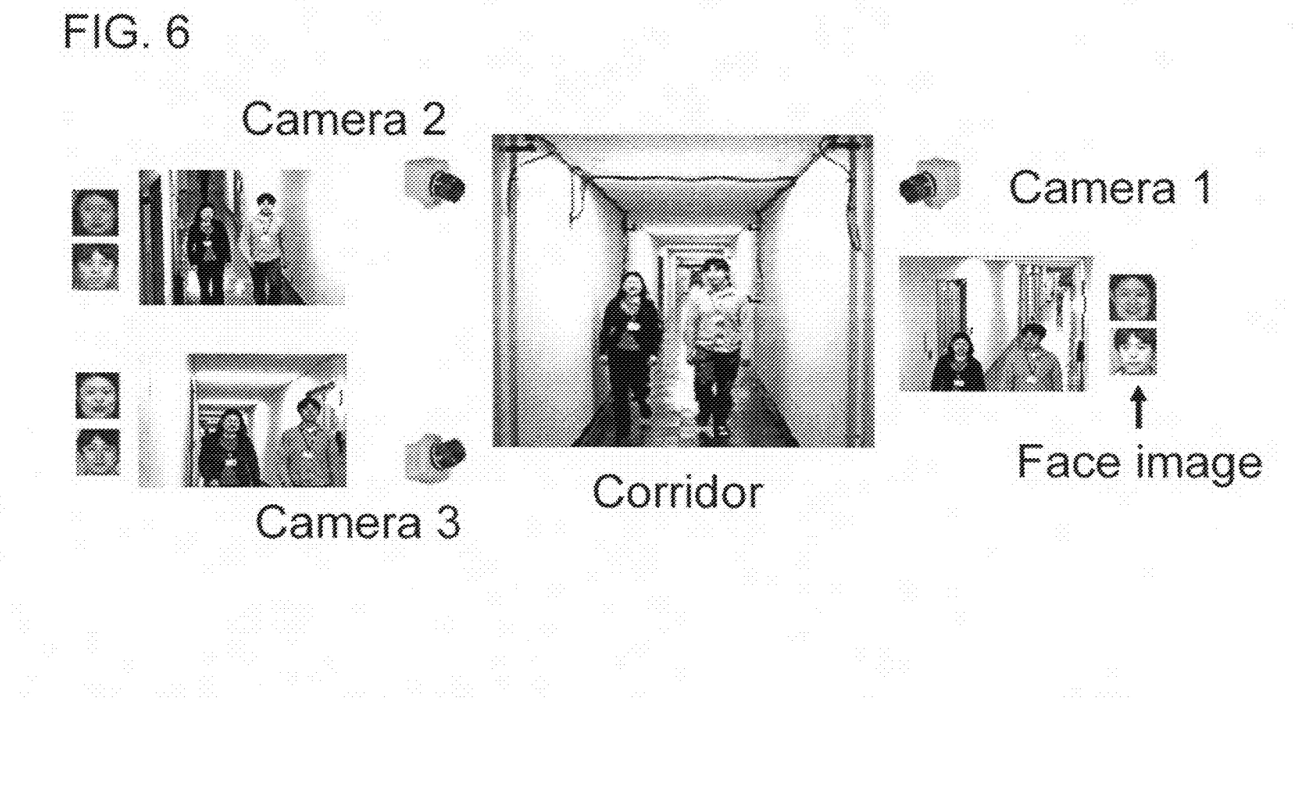
FIG. 6 is a conceptual drawing showing recognition of moving people using a plurality of cameras according to the first embodiment.
Figure 7:
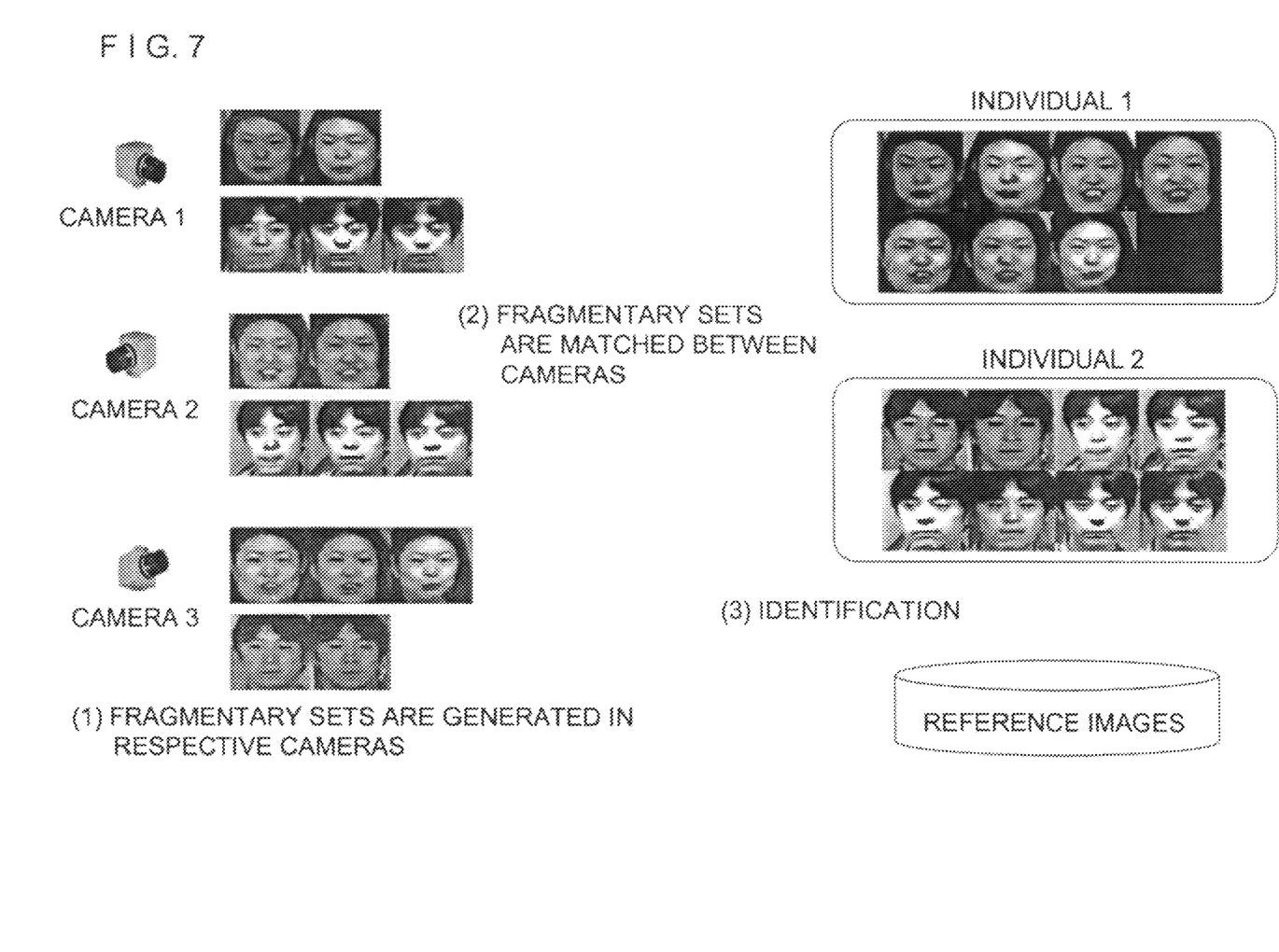
FIG. 7 is a conceptual drawing according to the first embodiment.
Figure 8:
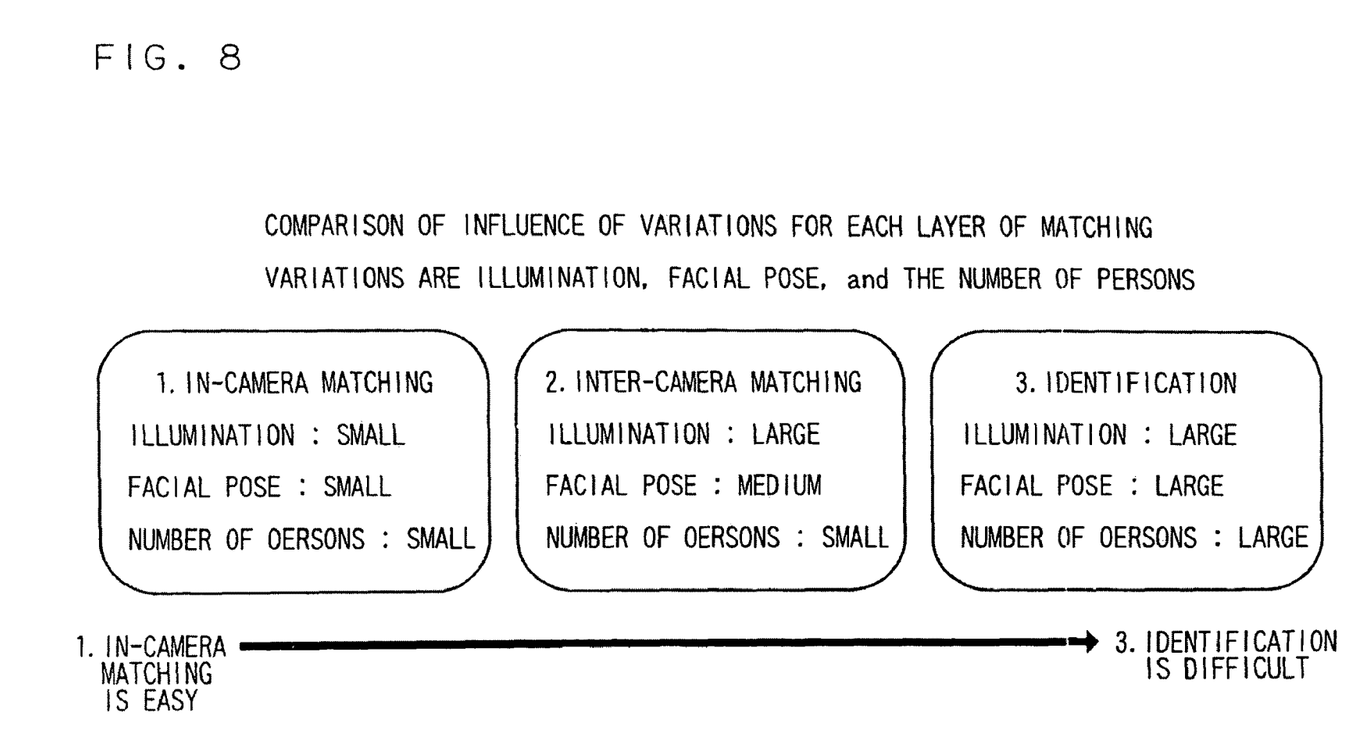
FIG. 8 is a drawing showing a comparison of difficulties of matching face images and identification.

For example, when a plurality of moving people are captured simultaneously as in FIG. 6 with a plurality of cameras, the embodiment become matching of face images between persons walking at the same time in the same place. Therefore, matching in the respective cameras and matching between cameras are performed according to a pattern matching method. As shown in FIG. 7, in the first step, fragmentary sets are generated for the respective persons by performing the matching in the respective cameras. Next, the fragmentary sets are matched between cameras to an integrated set of face images. Such matching does not require a follow up process of selecting best-shot face images for identification. An integrated set is achieved while limiting an influence of illumination, the facial pose, and the number of persons as in FIG. 8.

In the respective embodiments of the present invention, in the first step, the face images are matched in the respective cameras to generate the fragmentary sets.

Subsequently, the fragmentary sets are matched between the cameras, and an integrated set of face images for identification are generated.

Figure 9:
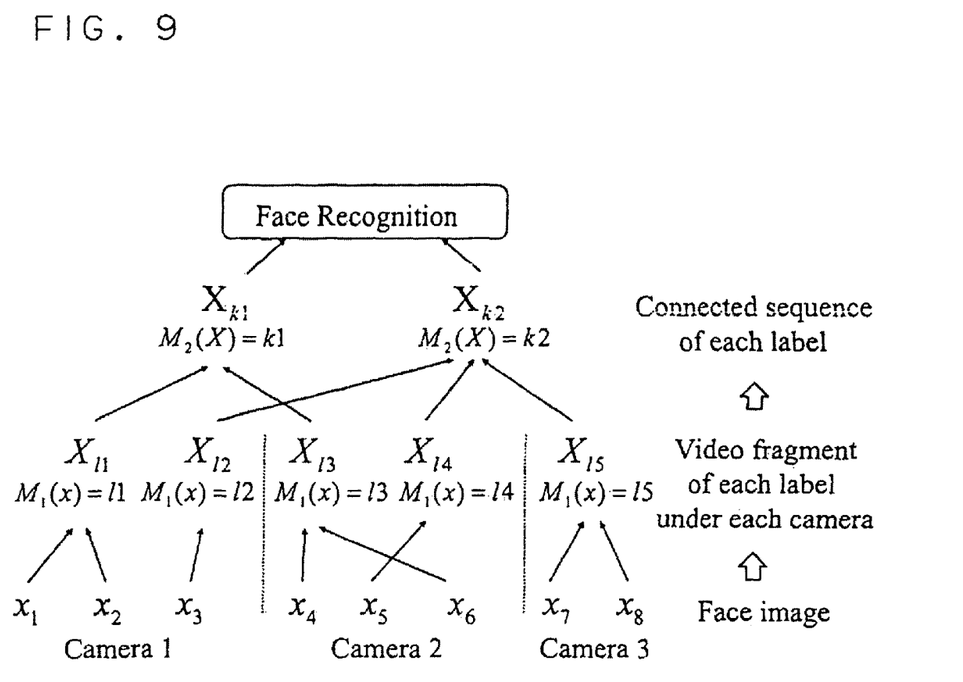
FIG. 9 is a drawing showing a flow of matching performed step by step in a case in which two persons walk under three cameras according to the first embodiment.

A fragmentary set $X_l$ is defined by an expression (1).

$$X_l \{x_i | M_1(x_i) = l, i = 1, \ldots N\} \tag{1}$$

where x represents a single face image, $M_1$ represents a function for returning a temporal label for the face image, l represents a label assigned to the fragmentary set, N represents the number of the acquired face images. The function $M_1$ will be described in a first embodiment. Subsequently, an integrated set of face images X is defined by an expression (2).

$$X_k \equiv \{X_j | M_2(X_j) = k, j = 1, \ldots, M\} \qquad (2)$$

where, $M_2$ represents a function for returning a temporal label to the fragmentary set, k represents a label assigned to the integrated movie image, and M represents the number of required fragmentary sets. The function $M_2$ will be described in the first embodiment. FIG. 9 shows a flow of matching performed step-by-step in a case in which two persons walk under three cameras.

An apparatus configured to generate fragmentary sets by matching face images for respective persons in respective cameras, and then to perform identification by matching the fragmentary sets between cameras will be described as the first embodiment below.

An apparatus in which a process of matching the fragmentary sets in the respective cameras is added to the first embodiment will be described as a second embodiment.

An apparatus in which a process of extracting person attributes such as gender is added to the first embodiment will be described as a third embodiment.

An apparatus in which a process of recording moving histories of the moving people such that which camera he/she has passed by is added to the first embodiment will be described as a fourth embodiment.

First Embodiment

Figure 1:
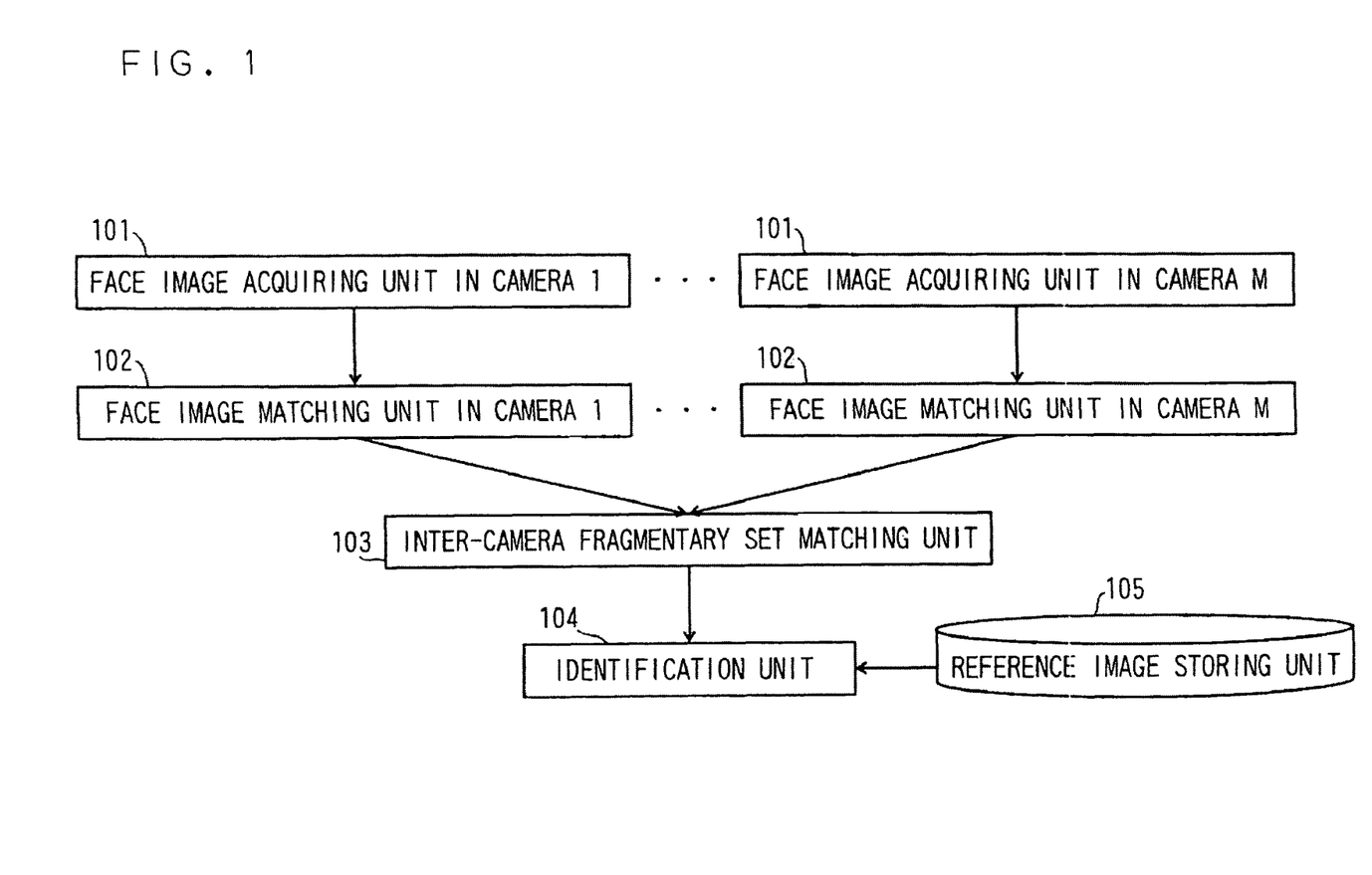
FIG. 1 is a diagram showing a configuration of a face recognition apparatus 100 according to a first embodiment of the present invention.
Figure 2:
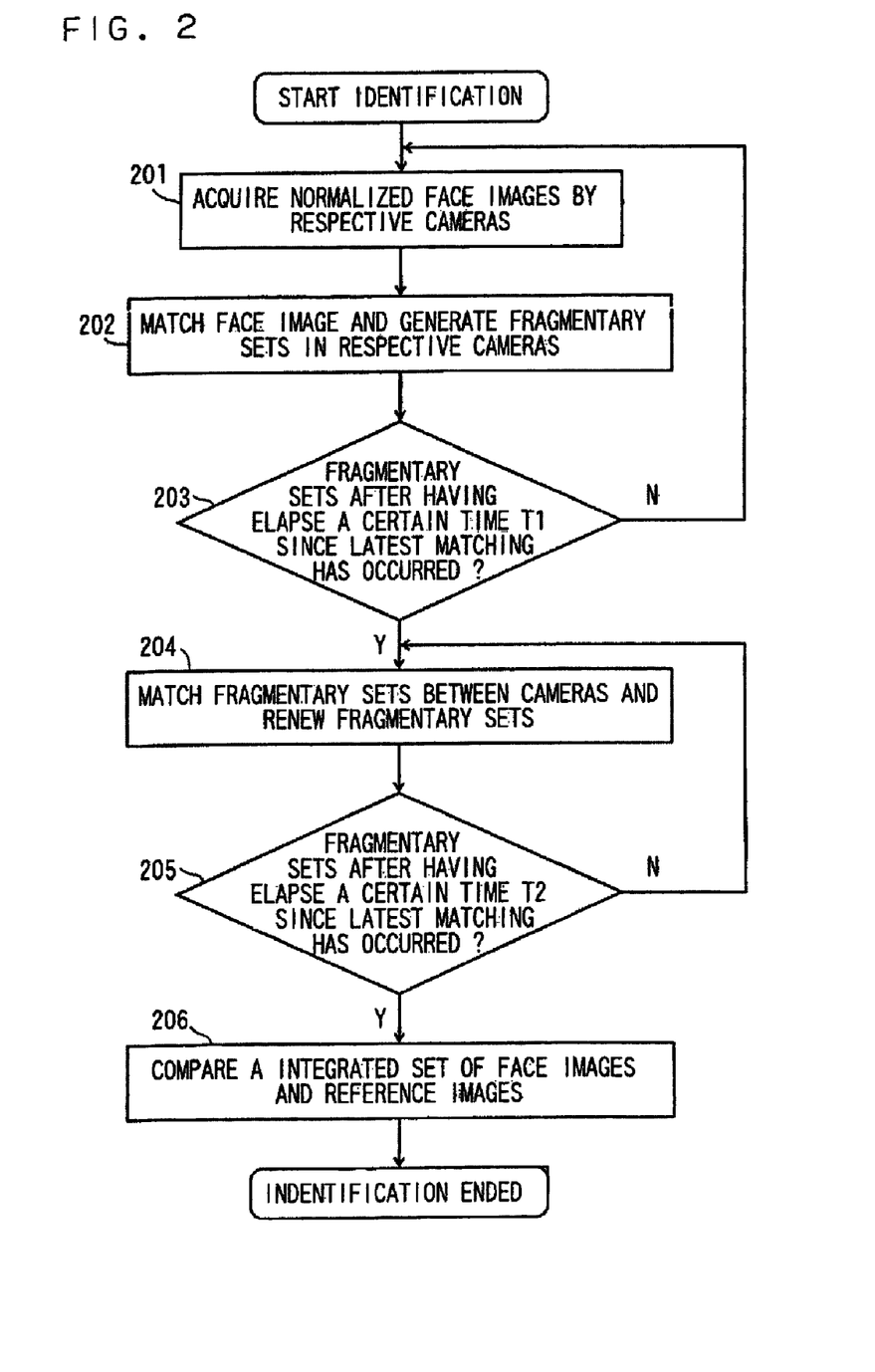
FIG. 2 is a drawing showing a flow of recognition of moving people.

Referring now to FIG. 1 and FIG. 2, a face recognition apparatus 100 according to the first embodiment of the present invention will be described. In the face recognition apparatus 100 according to the first embodiment, a plurality of (for example, three) cameras are installed in a corridor as shown in FIG. 6 for monitoring one position by these cameras. When moving people (for example, one man and one woman) go through this monitored area, identification of these moving people is performed. Face images from three cameras are matched for the respective persons in the cameras, and generate respective fragmentary sets as shown in (1) in FIG. 7. Subsequently, the fragmentary sets are matched between the cameras as shown in (2) in FIG. 7. Finally, the identification is performed as shown in (3) in FIG. 7.

(1) Configuration of Face Recognition Apparatus 100

FIG. 1 shows a configuration of the face recognition apparatus 100.

The face recognition apparatus 100 includes a face image acquiring unit 101, a face image matching unit 102 that performs matching of the face images in a camera, a fragmentary set matching unit 103 that performs matching of the face images between the cameras, an identification unit 104, and a reference image storing unit 105. The functions of the respective units 101 to 105 are realized by a program stored in a computer.

(2) Process of Face Recognition Apparatus 100

FIG. 2 shows a flowchart of a process of the face recognition apparatus 100.

(2-1) Face Image Acquiring Unit 101

The face image acquiring units 101 detect face regions from video sequence outputted from cameras (for example, video cameras), and generate normalized face images x (Step 201 in FIG. 2). The number of the face image acquiring units 101 corresponds to the number of the cameras.

By generating the normalized face images x, problems of the resolution of the face images effective for identification, variations in relative facial pose due to the difference of camera positions, and a change in relative lighting conditions caused by walking may be alleviated. Therefore, for example, (i) feature points on the faces are detected from face regions having resolutions higher than a certain level, (ii) facial pose normalization is applied using a three-dimensional shape model, and (iii) illumination normalization for extracting the ratio of the diffuse reflection factor, which is not affected by lighting conditions, is applied. In the step (i), for example, face detection is performed for images obtained by the cameras and, when the images have a certain size or larger, feature points on the faces such as pupils or nostrils are detected. In the step (ii), for example, the detected feature points are fitted to a three-dimensional facial shape mode, and then the facial pose is corrected to the front. In the step (iii), for example, a weight applied to a weighted Gaussian filter is determined for the face images in which the facial pose is corrected. The weight is determined by the difference in lighting conditions or reflection characteristics among respective pixels. The ratio of the diffuse reflection is extracted by applying a filtering process.

The term "lighting conditions" here means the direction of illumination, the brightness of the illumination (that is, illumination intensity), and the type of the illumination (whether the illumination is a point light source or a linear light source or a surface light source).

(2-2) Face Image Matching Unit 102

The face image matching units 102 matches the face images x at the current time outputted from the face image acquiring units 101 with the fragmentary sets accumulated until the current time in the cameras, and generate new fragmentary sets (Step 202 in FIG. 2). The number of the face image matching units 102 corresponds to the number of the cameras.

In order to perform matching in the cameras, the label is determined by the function $M_1$ every time when the face image x is acquired. Then, the face images x are added to the fragmentary set $X_1$ having the same label. The fragmentary set $X_1$ to which a new face image is not added for a certain time T1 or more is determined as a person passed through, and is outputted to the inter-camera fragmentary set matching units 103 (Step 203 in FIG. 2).

Function $M_1$ determines a temporal label using a similarity S of the latest face images $\bar{x} \in X$ and $\bar{x}$ which belong to fragmentary sets. The value of S is defined by the expression (3)

$$S = \frac{S_{simple}}{1 + \alpha(t - \bar{t})} \qquad (3)$$

where $S_{simple}$ represents a similarity between x, $\bar{x}$, $\alpha$ represents a constant, t, $\bar{t}$ represent time required for acquiring x, $\bar{x}$.

The similarity is defined by $S_{simple} = \cos^2 \theta$. The sign $\theta$ represents an angle formed between vectors converted by performing raster scanning of the face image. As another method, a subspace method using a subspace generated from the fragmentary sets may also be applied.

The function $M_1$ returns a label of the fragmentary set from which the highest similarity exceeding a threshold value S1 is calculated. When all the calculated similarities are smaller than S1, it is determined that a new person appears, and a new label is returned. When there is no accumulated fragmentary set to be matched as well, a new label is returned.

(2-3) Fragmentary Set Matching Unit 103

The fragmentary set matching units 103 generate the fragmentary sets $X_1$ outputted from the in-camera face image matching units 102, and match the fragmentary sets accumulated in the respective cameras until the current time and generate an integrated set of face images (Step 204 in FIG. 2).

In order to perform the matching between the cameras, the label of X is determined by the function $M_2$. The set of face images $X_1$, $X_1'$ having the same label are integrated to form a new fragmentary set. The fragmentary set having passed a certain time T2 is determined to have terminated the matching, and is outputted to the identification unit 104 as the integrated set of face images X (Step 205 in FIG. 2).

The function $M_2$ determines the label on the basis of a similarity S' among the fragmentary sets. In order to calculate the S', for example, Orthogonal Mutual Subspace Method (OMOS) which can compare a set of face images (see Japanese Patent Application Kokai No. 2005-141437 incorporated by reference) is used. The OMSM uses a linear matrix O which emphasizes the difference between persons. O is applied to the mutual subspace method for preprocess. In order to apply the OMSM, a principal component analysis is applied to X to generate subspaces. Assuming that the two subspaces linearly converted by O are P and Q, a similarity S between P and Q is determined by an expression (4) on the basis of the angle θ between the two subspaces referred to as a canonical angle.

$$S' = \cos^2 \theta \quad (4)$$

The label of the fragmentary set exceeding a threshold value S2 and from which the highest S' is calculated is returned. When all the calculated similarities S' are smaller than S2, a new label is returned.

(2-4) Identification Unit 104

The identification unit 104 compares the integrated set of face images X outputted from the inter-camera fragmentary set matching units 103 and the reference images of the respective persons stored in the reference image storing unit 105 using the OMSM to perform the identification (Step 206 in FIG. 2).

(3) Advantages

The face recognition apparatus 100 performs only a pattern matching method. This method does not need camera calibration in comparison with the method in the related art which performs strict camera calibration and tracking the three-dimensional position of the person, and hence time and cost for introducing the system are reduced.

According to this embodiment, since the matching is performed only on the basis of the pattern matching method without using the positional information in 2D or 3D world, the face recognition apparatus 100 can be applied to cameras having a low frame rate.

Second Embodiment

Figure 3:
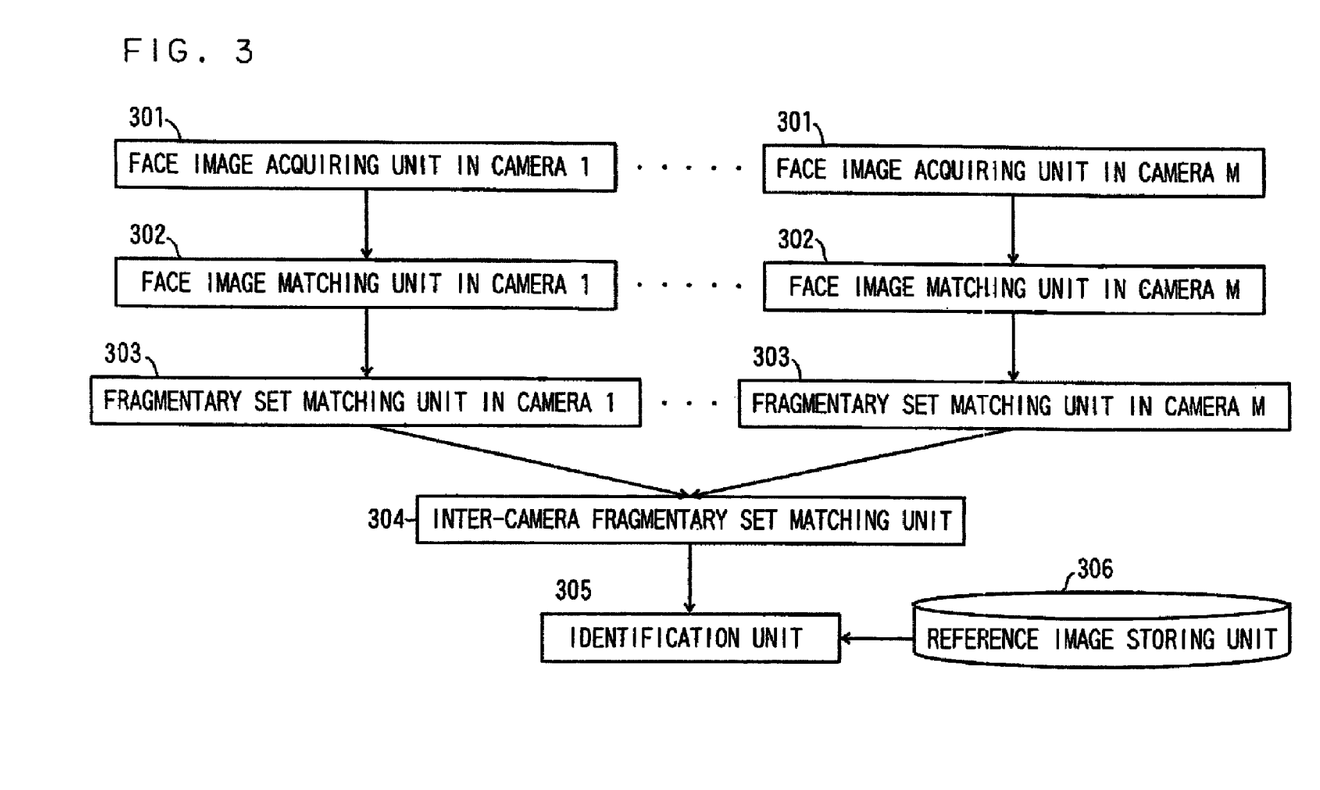
FIG. 3 is a diagram showing a configuration of a face recognition apparatus 300 according to a second embodiment.

Referring now to FIG. 3, a face recognition apparatus 300 according to the second embodiment of the present invention will be described. In this embodiment, an apparatus in which a process of matching the fragmentary sets in the respective cameras is added to the first embodiment is provided. There is a case in which some fragmentary sets are generated in the identical camera although the sets are generated from the identical person because the matching is failed by being affected by variations. In order to prevent occurrence of such event, the fragmentary sets are matched in the cameras before the matching between the cameras.

FIG. 3 shows a configuration of the face recognition apparatus 300.

The face recognition apparatus 300 includes a face image acquiring unit 301, an in-camera face image matching unit 302, an in-camera fragmental set matching unit 303, an inter-camera fragmentary set matching unit 304, an identification unit 305, and a reference image storing unit 306.

The face image acquiring unit 301 performs the same process as the face image acquiring unit 101, the inter-camera fragmentary set matching unit 304 performs the same process as the inter-camera fragmentary set matching unit 103, the identification unit 305 performs the same process as the identification unit 104, and the reference image storing unit 306 performs the same process as the reference image storing unit 105.

The face image matching unit 302 performs the same process as the face image matching unit 102. However, the destination of the generated fragmentary sets $X_1$ is different. The $X_1$ in which a new face image is not added for more than the certain time T1 is outputted to the in-camera fragmental set matching unit 303.

The in-camera fragmental set matching unit 303 matches the fragmentary sets $X_1$ outputted from the in-camera face image matching unit 302, accumulates the fragmentary sets until the current time in the identical camera, and updates the fragmentary sets. The same framework may be used as $M_2$ may be used as the function for returning the label to be used in the matching. By matching the separated fragmentary sets of the identical person, the subsequent inter-camera matching performance is improved, and hence the final recognition performance is improved.

Third Embodiment

Subsequently, referring now to FIG. 4, a face recognition apparatus 400 according to the third embodiment of the present invention will be described. In this embodiment, an apparatus in which a process of extracting person attributes such as gender is added to the first embodiment is provided. An object of this process is to record histories which indicate attributes of the persons (such as gender and age) when people moves whose face images are not registered in the system as reference data.

Figure 4:
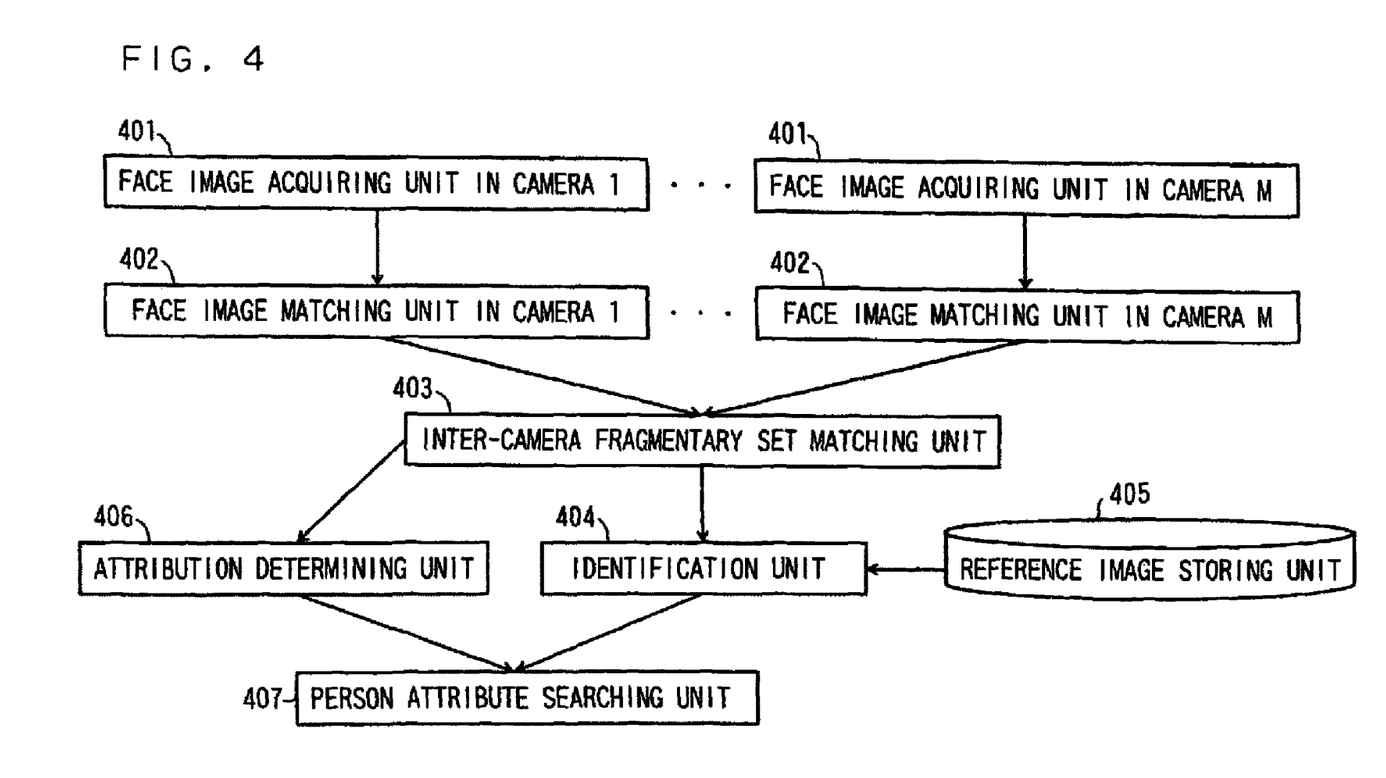
FIG. 4 is a diagram showing a configuration of a face recognition apparatus 400 according to a third embodiment.

FIG. 4 shows a configuration of the face recognition apparatus 400.

The face recognition apparatus 400 includes a face image acquiring unit 401, an in-camera face image matching unit 402, an inter-camera fragmentary set matching unit 403, an identification unit 404, a reference image storing unit 405, an attribution determining unit 406, and a person attribute searching unit 407.

The face image acquiring unit 401 performs the same process as the face image acquiring unit 101, the in-camera face image matching unit 402 performs the same process as the in-camera face image matching unit 102, the inter-camera fragmentary set matching unit 403 performs the same process as the inter-camera fragmentary set matching unit 103, the identification unit 404 performs the same process as the identification unit 104, and the reference image storing unit 405 performs the same process as the reference image storing unit 105.

The attribution determining unit 406 determines the attributes using the integrated set of face images outputted from the inter-camera fragmentary set matching unit 403, and records attribute information of the integrated set of face images. For example, when recognizing gender or age, references are generated from men's face images and women's face images respectively, and two-class identification is performed. In order to do so, for example, a subspace method or a support vector machine is used. It seems that presence or absence of eye glasses is also effective as another attribute for criminal investigations or the like. Therefore, the same method as the gender determination is employed using enlarged images around nose pieces of the eye glasses for classification.

The person attribute searching unit 407 searches whether what type of persons have passed through an area monitored by the cameras using the attribute information recorded by the attribution determining unit 406. For example, by entering conditions such as a time zone and gender, the moving people who match the conditions may be listed.

Fourth Embodiment

Figure 5:
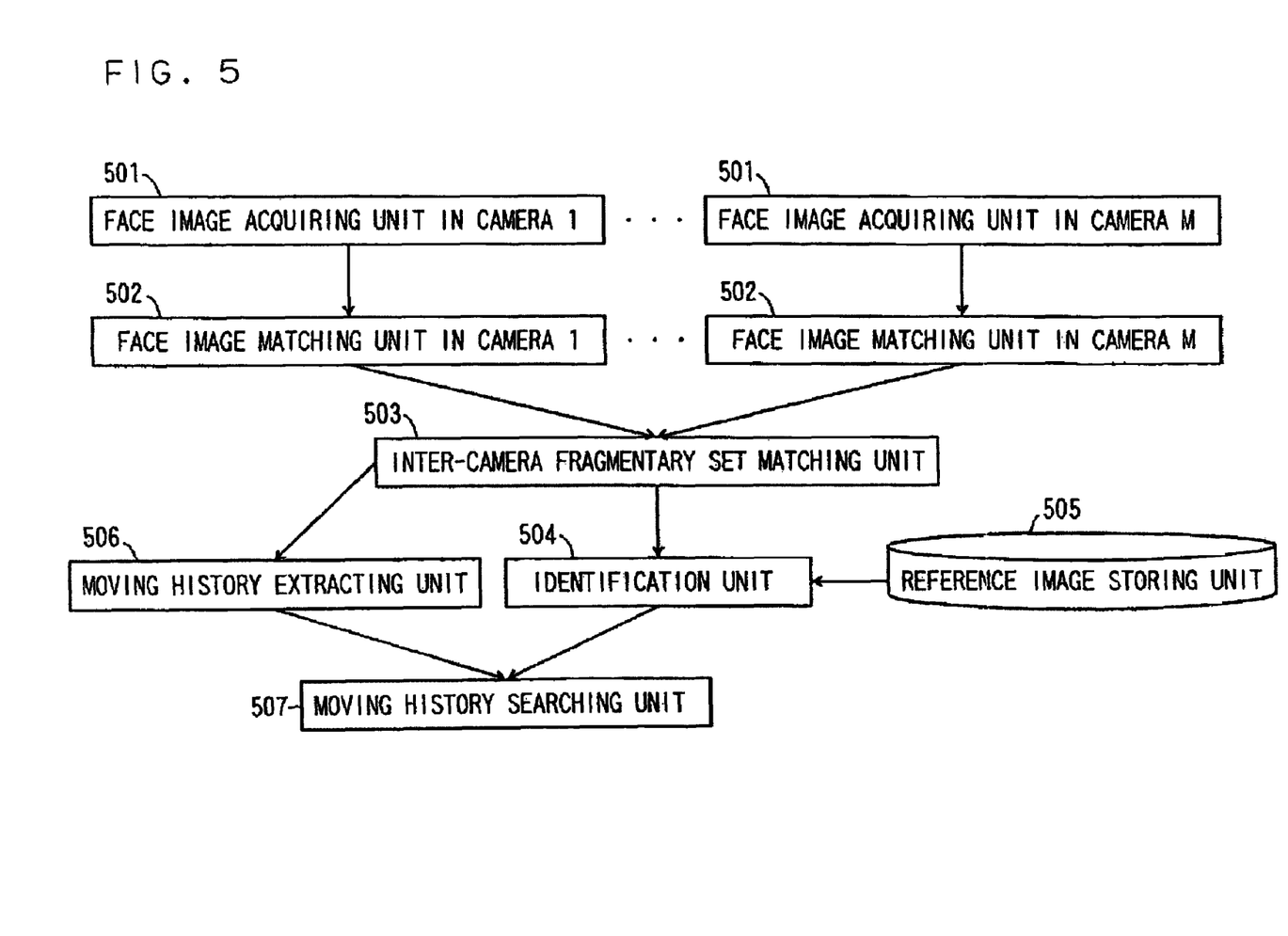
FIG. 5 is a diagram showing a configuration of a face recognition apparatus 500 according to a fourth embodiment.

Referring now to FIG. 5, a face recognition apparatus 500 according to the fourth embodiment of the present invention will be described. In this embodiment, an apparatus in which a process of recording moving histories of the moving people such that which camera he/she has passed by is added to the first embodiment will be described.

In a system configuration in FIG. 6, one place is monitored by the plurality of cameras. However, in this embodiment, the cameras may be arranged at different places. That is, the moving histories are recorded by adding acquired times of the day when the face images are recorded and camera numbers to the respective face images and searching the face images included in the integrated set of face images. The moving histories also can be recorded for persons who are not identified.

FIG. 5 shows a configuration of the face recognition apparatus 500.

The face recognition apparatus 500 includes a face image acquiring unit 501, an in-camera face image matching unit 502, an inter-camera fragmentary set matching unit 503, an identification unit 504, a reference image storing unit 505, a moving history extracting unit 506, and a moving history searching unit 507.

The face image acquiring unit 501 performs the same process as the face image acquiring unit 101, the in-camera face image matching unit 502 performs the same process as the in-camera face image matching unit 102, and the inter-camera fragmentary set matching unit 503 performs the same process as the inter-camera fragmentary set matching unit 103, the identification unit 504 performs the same process as the identification unit 104, and the reference image storing unit 505 performs the same process as the reference image storing unit 105. However, all face images are added with the camera number and the time of the day of the acquisition.

The moving history extracting unit 506 extracts the moving history of a person which corresponds to the integrated set of face images on the basis of the camera number and the time of the day of the face image included in the integrated set of face images outputted from the inter-camera fragmentary set matching unit 503, and stores the moving history of the person corresponding to the integrated set.

In the moving history searching unit 507, the moving history recorded by the moving history extracting unit 506 is searched. This unit can build a system of visualizing what type of the human exists at a certain time of the day by attaching cameras to a building.

Modification

The embodiments of the present invention may be modified variously without departing the scope of the invention.

What is claimed is:

1. A face recognition apparatus that recognizes faces of a plurality of persons, comprising:
a plurality of cameras configured to pick up, in time series, the plurality of persons moving at the same time in the same place;
a face image acquiring unit configured to acquire respective face image sets including face images in time series from the respective image sequences;
an intra-sequence classifying unit configured to add the face images in the respective face image sets into fragmental face image sets each including the face images having high correlation with each other by (1) obtaining simple similarities between the acquired face images and latest face images which belong to the fragmental face image sets respectively, (2) obtaining a difference between a time when the acquired face images are acquired and a time when the latest face images of the fragmental face image sets are acquired, (3) obtaining first similarities by dividing the simple similarities by the difference for each of the fragmental face image sets respectively, and (4) adding the acquired face images into the fragmental face image set having the first similarity highest among the respective first similarities;
an inter-sequence classifying unit configured to generate integrated sets each including the fragmental face image sets having high correlation with each other by (1) obtaining second similarities between the fragmental face image sets respectively, and (2) integrating the fragmental face image sets having the second similarities high with each other;
a reference image storing unit configured to store respective reference face image sets of respective persons acquired in advance for identification; and
an identification unit configured to compare the respective integrated sets with the reference face image sets to identify the persons.

2. The apparatus according to claim 1, wherein the intra-sequence classifying unit and the inter-sequence classifying unit perform the classifying using a pattern matching method between the face images.

3. The apparatus according to claim 2, wherein the face image acquiring unit normalizes the size, facial pose or lighting conditions of the face images to generate normalized face images.

4. The apparatus according to claim 2, wherein time information is added to the face images, and
wherein the inter-sequence classifying unit classifies a new fragmental face image set into an integrated set using the time information.

5. The apparatus according to claim 1, wherein the intra-sequence classifying unit classifies the face images into the fragmental face image sets, and then integrates fragmental face image sets having high correlation with each other.

6. The apparatus according to claim 1, further comprising:
an attribution determining unit configured to extract and store attribution information of a person using the integrated set; and
a person attribute searching unit configured to search the attribution information stored in the attribution determining unit.

7. The apparatus according to claim 1, further comprising:
a moving history extracting unit configured to extract and store a moving history of the person using the integrated set; and
a moving history searching unit configured to search the moving history stored in the moving history extracting unit.

8. A face recognition method performed by a face recognition apparatus that recognizes faces of a plurality of persons, the method being performed in a computer and comprising:

picking up, in time series by a plurality of cameras, the plurality of persons moving at the same time in the same place;

acquiring respective face image sets including face images in time series by cameras;

adding the face images in the respective face image sets into fragmental face image sets each including the face images having high correlation with each other by (1) obtaining simple similarities between the acquired face images and latest face images which belong to the fragmental face image sets respectively, (2) obtaining a difference between a time when the acquired face images are acquired and a time when the latest face images of the fragmental face image sets are acquired, (3) obtaining first similarities by dividing the simple similarities by the difference for each of the fragmental face image sets respectively, and (4) adding the acquired face images into the fragmental face image set having the first similarity highest among the respective first similarities;

generating integrated sets each including the fragmental face image sets having high correlation with each other by (1) obtaining second similarities between the fragmental face image sets respectively, and (2) integrating the fragmental face image sets having the second similarities high with each other;

storing respective reference face image sets of respective persons acquired in advance for identification; and comparing the respective integrated sets with the reference face image sets to identify the persons.

9. The apparatus according to claim 1, wherein the inter-sequence classifying unit obtains the second similarity by an orthogonal mutual subspace method.

10. The method according to claim 8, wherein the second similarity is obtained by an orthogonal mutual subspace method.

* * * * *